(No Model.)

B. T. SCOTT.
CULTIVATOR.

No. 493,124. Patented Mar. 7, 1893.

WITNESSES:
Chas. Nida
C. Sedgwick

INVENTOR
B. T. Scott
BY Munn & Co.
ATTORNEYS.

UNITED STATES PATENT OFFICE.

BLUFORD T. SCOTT, OF MILFORD, ILLINOIS.

CULTIVATOR.

SPECIFICATION forming part of Letters Patent No. 493,124, dated March 7, 1893.

Application filed November 12, 1892. Serial No. 451,827. (No model.)

*To all whom it may concern:*

Be it known that I, BLUFORD T. SCOTT, of Milford, in the county of Iroquois and State of Illinois, have invented a new and useful Improvement in Cultivators, of which the following is a full, clear, and exact description.

My invention relates to an improvement in cultivators, and has for its object to provide in one implement a combination of gopher blades and shovels, for the purpose of first stirring the ground with the shovels, and then leveling said ground by means of the gopher blades, and the invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1:
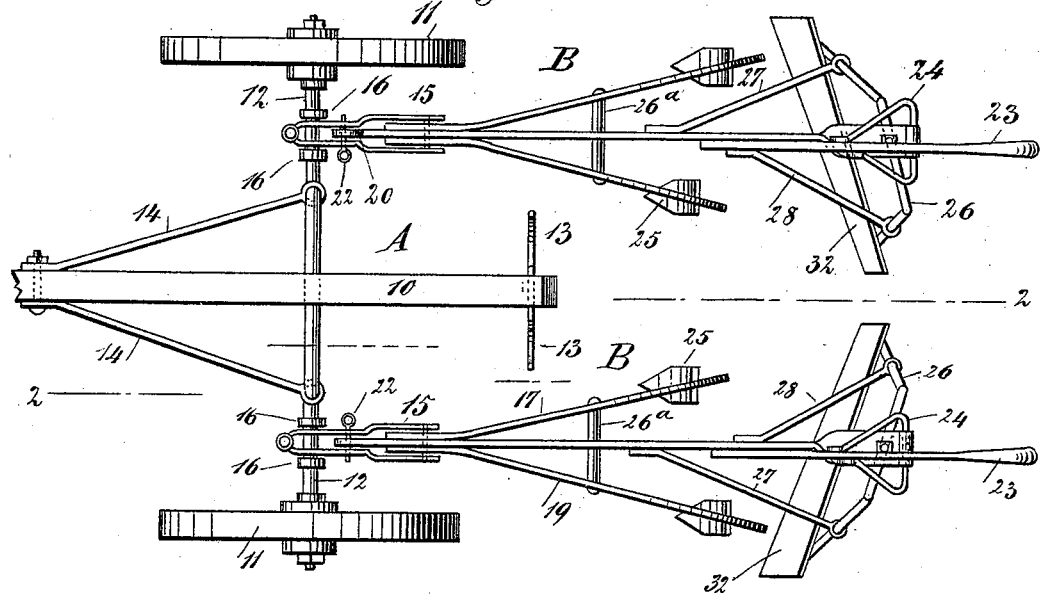
Figure 2:
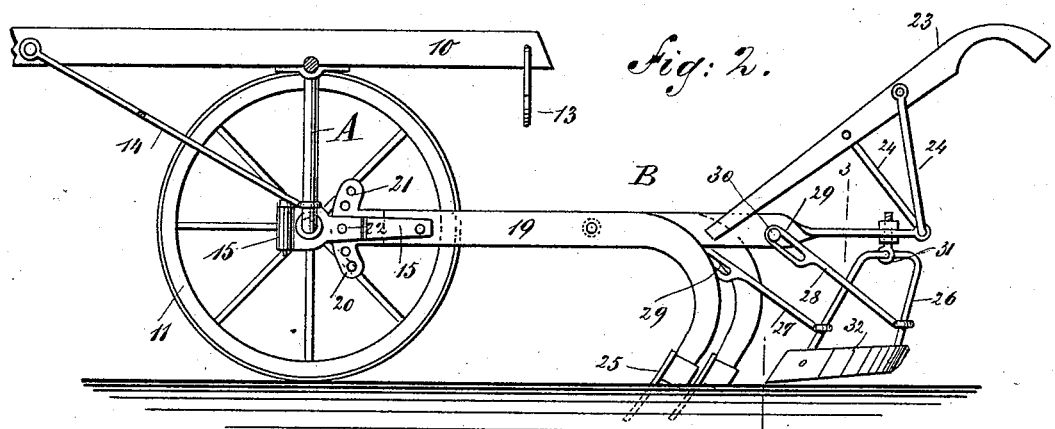
Figure 3:
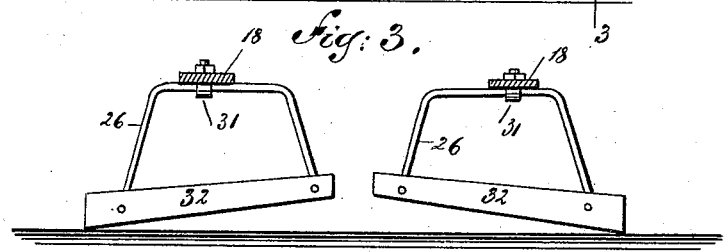

Figure 1 is a plan view of the cultivator. Fig. 2 is a side elevation; and Fig. 3 is a vertical section taken practically on the line 3—3 of Fig. 2.

In carrying out the invention the forward axle A, is of a yoke pattern, the pole 10 being secured to the upper central portion of the axle; and supporting wheels 11, are journaled upon horizontal branches 12 from the extremities of the members of the yoke section. The pole extends rearward beyond the axle, and is usually provided at its rear end upon each side with a hook or loop 13, adapted as a guide for the reins; and the forward portion of the pole is supported by braces 14, attached to the pole and to the vertical members of the yoke section of the axle. Upon each lower horizontal member 12 of the axle a clevis arm 15, is fulcrumed, and the clevises are prevented from moving laterally upon the axle by collars 16, or their equivalents. The clevis arms are so constructed that their body portion consists of two parallel members, and between these members the beams B, adapted to carry the cultivator and gopher blades are adapted to be pivoted. Each set of beams is three in number, and two sets are employed, one being pivoted in each of the clevis arms. The beams of each set are designated as 17, 18 and 19. The beam 18, is the central one of the set, and preferably consists of a bar of metal having formed at its forward end a head 20, which head is somewhat semi-circular, and extends beyond the upper and lower edges of the beam. The head of the central beam of a set is provided with a series of openings or apertures 21, and the beam is fulcrumed in its clevis arm back of the head. The apertures 21, are provided in order that the beam may be adjusted so as to approach the ground or be carried upward therefrom; and the beam is held in position by passing a pin 22, through the openings in the clevis arm and through the aperture 21 in the head of the central beam registering with that opening. The central beam at its rear end is curved in such a manner as to present a flat surface at top and bottom, as in the remaining portion of the beam its edges face upward and downward.

The handles 23, by means of which the beams are guided, are attached to the central beams of each set forward of their twisted portion; and the handles are maintained in a rearwardly inclined position by means of braces 24, the said braces being attached to the handles and to the central beams 18 near their rear extremities. The braces are of somewhat peculiar construction, and consist of a rod bent essentially to a triangular shape, the base portion of the braces being attached to the central beam 18, while the side portions of the braces are secured to opposite sides of the handles, one of the side sections being in advance of the other.

The outer beams 17 and 19 of a set are securely fastened at their forward ends to the central beam 18; and the outer beams diverge from the inner beams, one rearwardly and outwardly and the other rearwardly and inwardly, so that between their rear portions and the central beam quite a space intervenes. The outer beams at their rear ends are curved downward in direction of the ground; and upon each of these beams a cultivator blade 25 of any approved construction is secured. Spacing blocks 26ª, rigidly maintain the outer beams at proper distance from the inner ones; and it is evident that when the central beam of a set is adjusted the side beams belonging to that set will have the same adjustment.

Upon the under face of the rear flat portion of each central beam, an essentially inverted U-shaped shank 26, is pivotally secured, extending downwardly and forwardly from the said central beams. These shanks are adapted to be laterally adjusted, one independent of the other, and the adjustment is accomplished to each of the members of each shank 26 by an adjusting rod or bar which likewise serves as a brace. These rods or bars are designated in the drawings as 27 and 28, and each of them has an elongated opening 29, formed in its upper end, as their upper ends are adapted to engage with the perpendicular portions of the central beams forward of their flattened or horizontal rear portions.

The inner adjusting rods 28, are made to engage with the inner faces of the central beams and engage with said beams near the point where the deflection in construction of the beam is made. A set screw 30 of any approved character is the attaching medium, being passed through the elongated slot 29 of the adjusting bar, and through the beam with which it is connected. The outer adjusting bars 27, are longer than the inner ones, and the slotted ends of these outer bars engage with the central beams upon the outer faces thereof between the inner and outer beams and ordinarily adjacent to the handles 23. The attachment of these outer adjusting bars is effected in like manner as the inner bars; and it is evident that the shanks 26, may be adjusted laterally to give them any desired inclination with respect to a central longitudinal line drawn through the machine, that is to say, the shanks may be carried at any angle from that line; and it is further evident that the shanks may be adjusted so that one of their ends will be raised higher than the other, since, as has heretofore been stated, the shanks 26, have virtually a swivel connection with the central beams, the bow portions of the shanks passing through eye bolts 31, which eye bolts are pivotally connected with the central beam.

Each shank 26 has connected with its lower end a gopher blade 32, and these blades follow the cultivator blades 25, as is fully shown in the drawings. The position of the blades may be changed, that is, may be given more or less of a slant, so that when they are flat with the ground the soil will pass over them; or when they are upright, that is, the back raised higher than the front edge, the soil will be dragged to or from the plants as the operator may desire.

The adjusting bars are so constructed that they are interchangeable, that is, the upper end of the rear adjusting bar where it is attached to the beam may be moved to the same point on the beam where the bar that was in front was fastened, and the front bar moved back on the beam to the point that has been occupied by the rear bar, thus changing the position of the blades, that is, bringing the end that was in the rear to the front.

It is evident that in a machine constructed as above set forth the soil will be stirred by the shovels and leveled by the gopher blades as the machine advances, and that the shovels are kept away from the plants, the gopher blades running the closest to them, thereby lessening danger to the roots of the plants. By reason of the difference in the length and in the manner of connecting the two braces or adjusting bars of a gopher blade the outer end of the blade is always the lowest, so that it can run close to young plants without injury thereto. The blades are reversible, as has been heretofore stated, by changing the adjusting bars or braces on the beam, thereby allowing the operator to throw the soil to or from the plant as he may desire.

Having thus described my invention, I claim as new and desire to secure by Letters Patent—

1. In a cultivator, the combination, with an axle, and beams arranged in groups of three pivotally and adjustably connected with the axle, the said beams comprising a long central beam and shorter outer beams, of cultivator blades attached to the outer beams, and a gopher blade adapted to cover the track of the cultivator blades, the gopher blade having an adjustable connection with the central or longer beam, as and for the purpose specified.

2. In a cultivator, the combination, with an axle, clevis arms pivotally attached to the axle, and beams arranged in connected groups of three adjustably located in the clevis arms, each group of beams comprising a central long beam and two outer shorter beams, of cultivator blades attached to the outer beams, yoke-like shanks having a swivel connection with the rear ends of the central beams, gopher blades carried by the said shanks, the said gopher blades crossing the path of the cultivator blades, and adjusting bars connecting the shanks with the central beam, as and for the purpose set forth.

3. In a cultivator, the combination, with a bow or yoke axle, supporting wheels loosely mounted thereon, a pole carried by the central upper portion of the axle, and clevis arms pivoted upon the axle, one at each side of its center, of beams arranged in connected sets of three adjustably connected with the clevis arms, each set comprising a central beam and two outer beams of less length spaced from the center beam, cultivator blades secured to the outer beams of the sets, yoke-like shanks having a swivel attachment to the outer end of the central beam, a gopher blade carried by each of the shanks, the gopher blades crossing the path of the cultivator blades, and adjustable, removable and interchangeable bars connected with the members of the shanks and also with opposite sides of the central beam of the sets of beams, as set forth.

BLUFORD T. SCOTT.

Witnesses:
THOMAS VENNUM,
I. T. VENNUM.